(12) United States Patent
Molnar et al.

(10) Patent No.: US 8,333,424 B2
(45) Date of Patent: Dec. 18, 2012

(54) AIR GUIDE DEVICE

(75) Inventors: Bela Molnar, Ehningen (DE); Tom Gürtler, Ditzingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 887 days.

(21) Appl. No.: 12/466,714

(22) Filed: May 15, 2009

(65) Prior Publication Data
US 2009/0286460 A1 Nov. 19, 2009

(30) Foreign Application Priority Data

May 16, 2008 (DE) .................. 10 2008 024 896

(51) Int. Cl.
*B60J 7/057* (2006.01)
(52) U.S. Cl. .................... 296/180.2; 296/180.1
(58) Field of Classification Search ..... 296/180.1–180.5
See application file for complete search history.

(56) References Cited

U.S. PATENT DOCUMENTS

| | | | | |
|---|---|---|---|---|
| 4,810,022 A * | 3/1989 | Takagi et al. | .............. | 296/180.5 |
| 5,165,751 A * | 11/1992 | Matsumoto et al. | ....... | 296/180.5 |
| 5,454,619 A * | 10/1995 | Haraway, Jr. | .............. | 296/180.1 |
| 5,678,884 A * | 10/1997 | Murkett et al. | ............ | 296/180.1 |
| 5,923,245 A * | 7/1999 | Klatt et al. | .................... | 340/479 |
| 7,322,638 B2 | 1/2008 | Larson | | |
| 7,438,347 B2 | 10/2008 | Froeschle | | |
| 2002/0011742 A1 * | 1/2002 | Choi | .......................... | 296/180.1 |
| 2005/0077753 A1 * | 4/2005 | Burg | .......................... | 296/180.5 |
| 2007/0001482 A1 | 1/2007 | Larson | | |
| 2007/0145776 A1 * | 6/2007 | Grave et al. | ................. | 296/180.5 |
| 2010/0019479 A1 * | 1/2010 | Haynes | ........................ | 280/770 |

FOREIGN PATENT DOCUMENTS

| | | |
|---|---|---|
| DE | 103 09 369 A1 | 9/2004 |
| DE | 10 2004 043 544 A1 | 3/2006 |
| DE | 44 27 196 A1 | 3/2006 |
| DE | 10 2005 030 203 A1 | 1/2007 |
| DE | 10 2004 030 571 B4 | 3/2007 |
| DE | 10 2006 014 260 A1 | 10/2007 |
| EP | 0 226 778 A2 | 7/1987 |
| JP | 62037286(A) | 2/1987 |
| KR | 10-2007-0001807 | 1/2007 |

OTHER PUBLICATIONS

German Search Report, mailed Mar. 6, 2012 (w/partial English Translation).

\* cited by examiner

*Primary Examiner* — Lori Lyjak
(74) *Attorney, Agent, or Firm* — RatnerPrestia

(57) ABSTRACT

An air guide device for a motor vehicle, especially a rear spoiler, which can be moved between a retracted, nonoperating position and an extended, operating position and comprises an air guide body, on which two lateral air guide body sections, which can be moved in the transverse direction of the vehicle, are arranged. It is provided that the contours of the bottom surfaces of the lateral air guide body sections facing the vehicle conform to the cooperating external vehicle contour at least when the these air guide body sections are in the operating position.

9 Claims, 1 Drawing Sheet

US 8,333,424 B2

AIR GUIDE DEVICE

CROSS REFERENCE TO RELATED APPLICATIONS

This U.S. application claims priority to German Application DE 10 2008 024 896.7, filed on May 16, 2008, which is incorporated by reference herein in its entirety.

FIELD OF THE INVENTION

The present invention to an air guide device for a motor vehicle, especially a rear spoiler. The invention also pertains to a motor vehicle equipped with this type of air guide device.

BACKGROUND OF THE INVENTION

The air guide device of the general type in question is known from, for example, DE 10 2006 014 260 A1. The known air guide device comprises an air guide body arranged essentially in the center, on which two lateral air guide body sections are arranged, which can be moved in the transverse direction of the vehicle. The air guide device can be adjusted between a retracted, nonoperating position and an extended, operating position, where the two lateral air guide body sections are extended when the air guide device is in the operating position and thus increase the air guide surface available for generating downforce.

An air guide device for a motor vehicle which comprises a spoiler is also known from DE 10 2004 030 571 B4. An adjusting device is able to move the spoiler between a nonoperating position, in which it lies essentially within the contour of the vehicle, and an operating position, in which it projects above the contour of the vehicle. The spoiler surface of the spoiler can be increased by spoiler sections which can be extended laterally.

Finally, an air guide device for a vehicle is known from DE 10 2005 030 203 A1, which, to improve the downforce, comprises spoiler blade sections on a rear axle, these blade sections being extendable in the transverse direction of the vehicle. In its operating position, the spoiler blade extends out from both sides of the central part of the body in the area of the side parts or fenders of the vehicle.

SUMMARY OF THE INVENTION

The present invention deals with the problem of providing, for an air guide device of the general type in question, an improved or at least a different embodiment which comprises an especially high degree of aerodynamic efficiency.

The invention relates to the general idea of providing, on a rear air guide device, two air guide body sections, which can be extended in the transverse direction of the vehicle, and of adapting the bottom surface of the two side air guide body sections to conform to an opposing or cooperating external contour of the vehicle. In general, the air guide device or an essentially centrally located air guide body of that device can be moved between a retracted, nonoperating position and an extended, operating position, where the air guide body usually executes a rotational and/or translational movement as it is being extended. Because the bottom surfaces of the extendable air guide body sections are designed to be complementary to the external contour of the vehicle, it is possible for the guide body sections to lie very close to the external vehicle contour when the air guide device is in its operating position. Minimizing the distance between the lateral air guide body sections and the external vehicle contour, such as a fender or trunk lid, prevents air from flowing underneath the air guide device or the air guide body and thus improves the aerodynamics of the vehicle. The bottom surfaces of the air guide body sections, which are designed to conform to the external vehicle contour, create a dynamic pressure in front of the air guide body itself and/or, with respect to the driving direction, in front of the air guide body sections, which helps the air flow resulting from the wind to flow only over the air guide device and not under it.

In another advantageous embodiment of the inventive solution, at least one sealing element is provided at least in the area of the bottom surface of the lateral air guide body sections, which sealing elements seal off the gap remaining between the air guide body sections and the external vehicle contour. A sealing element of this type thus contributes to the almost complete sealing-off of the gap and thus to the complete prevention of the flow of air underneath the air guide body sections, i.e., the air guide body. Of course, it is also conceivable that these types of sealing elements could also be arranged on the air guide body which carries the lateral air guide body sections. The minimum of one sealing element can be designed, for example, in the manner of an elastic rubber lip, which, when the air guide device is extended, rests with a sealing action on the external vehicle contour. One or more of these sealing elements improve the downforce on the motor vehicle and thus the vehicle's driving behavior.

In another advantageous embodiment of the inventive solution, an adjusting movement of the lateral air guide body sections in the transverse direction of the vehicle is coupled with an adjusting movement of the air guide body itself. It is conceivable here that an extension movement of the air guide body can be, for example, controlled as a function of velocity, where, by means of an appropriately designed adjusting mechanism, an extension movement of the lateral air guide body sections in the transverse direction of the vehicle is also controlled as a function of velocity. As a result of an extension movement controlled in this way, the downforce which the air guide device can achieve can be generated in a highly individual and demand-fulfilling manner.

Additional important features and advantages of the invention can be derived from the drawings, and from the associated description of the figures on the basis of the drawings.

It should be obvious that the features cited above and to be explained below can be applied not only in the combination specifically stated but also in other combinations or even alone without leaving the scope of the present invention.

Preferred exemplary embodiments of the invention are illustrated in the drawings and are explained in greater detail in the form of description, where the same, similar, or functionally equivalent parts are designated by the same reference numbers.

BRIEF DESCRIPTION OF THE DRAWINGS

In schematic fashion.

DETAILED DESCRIPTION OF THE DRAWINGS

Figure 1:
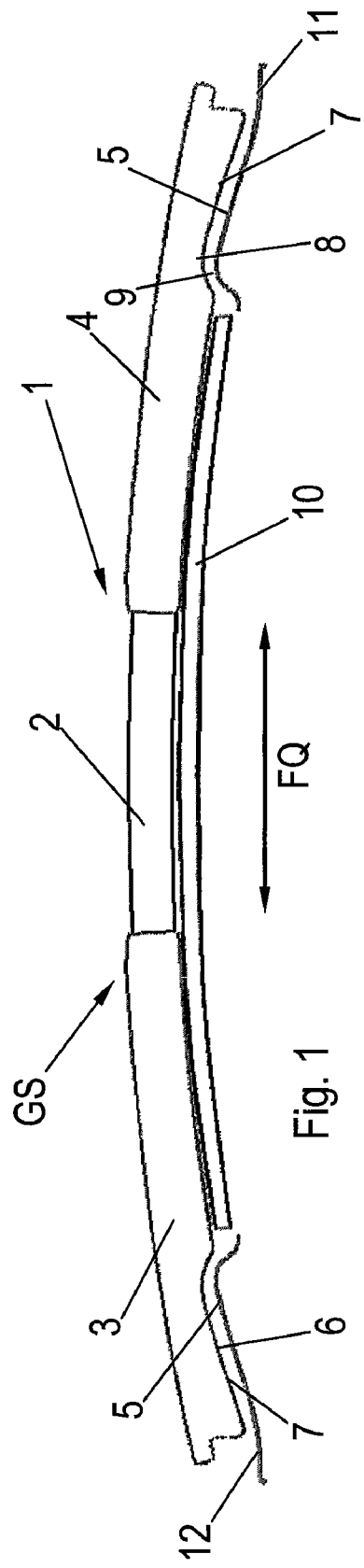
FIG. 1 shows a cross-sectional view of the inventive air guide device, where the plane of the cross section lies in the transverse direction of the vehicle.

As shown in FIG. 1, an air guide device 1 for a motor vehicle (not shown) comprises an air guide body 2 and two air guide body sections 3 and 4 arranged laterally thereon. The air guide device 1 can be on the rear of the motor vehicle and designed as, for example, a rear spoiler and can be adjusted between a retracted, nonoperating position (not shown) and an extended, operating position "GS". In the retracted, nonoperating position, the air guide device 1 preferably lies within an external contour 5 of the vehicle, whereas, in the operating position, at least portions of it projects beyond the external vehicle contour 5, where it can unfold its aerodynamic effect. The external vehicle contour 5 can be, for example, the side of a rear fender 11, 12 or a side area of a trunk lid 10 of the motor vehicle.

So that the air guide surface contributing to the aerodynamic action or downforce of the motor vehicle can be increased, the two lateral air guide body sections 3 and 4 can be extended at least in the transverse direction (double arrow FQ) of the vehicle. The lateral extension movement of the air guide body sections 3 and 4 occurs during or after the extension movement of the air guide body 2 from the nonoperating position into the operating position GS and is coupled, for example, with the extension movement of that body. To obtain in addition the most highly optimized aerodynamic effect possible from the air guide device 1, it is advantageous to prevent most if not all of the wind-generated air stream which produces the aerodynamic effect, especially the downforce, from flowing underneath the air guide device. The air stream should preferably flow exclusively over the top of the air guide body 2, i.e., the two air guide body sections 3, 4. The important point here is that the gap 6, which is present between the external vehicle contour 5 and the bottom surface 7 of the air guide body sections 3 and 4, should be kept as small as possible. For this reason, the contour of the bottom surfaces 7 of the lateral air guide body sections 3, 4 facing the vehicle is or can be adapted according to aspects of the invention to conform to the cooperating external vehicle contour 5. That is, at least when the air guide device 1 is in the operating position GS, the bottom surface 7 in question is adapted to conform to the external vehicle contour 5.

Figure 2:
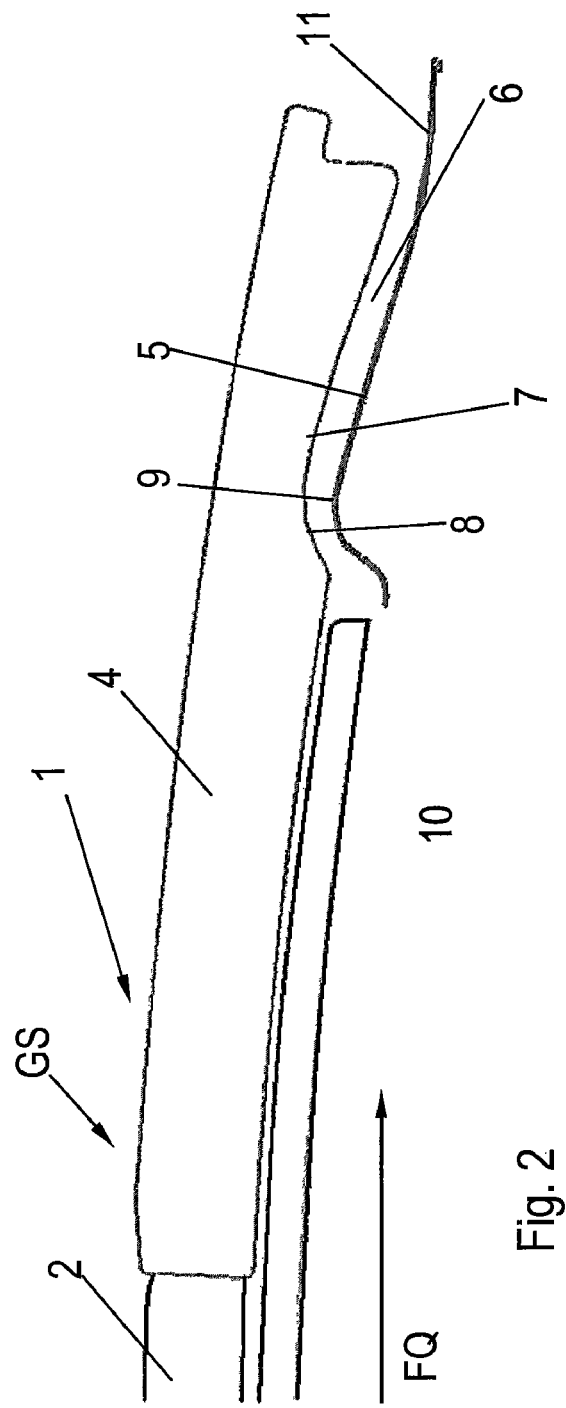
FIG. 2 shows a view of a detail of the cross section of FIG. 1.

According to FIGS. 1 and 2, it can be seen that the bottom surface 7 of the air guide body section 4 comprises a recess 8, which is designed to be essentially complementary to an elevation 9 of the external vehicle contour 5. As a result of the shape of the bottom surface 7, which is or can be adapted to the external vehicle contour 5, the air guide body sections 3 and 4 lie very closely against the cooperating external vehicle contour 5, which makes it possible to minimize the width of the gap 6.

The external vehicle contour 5 in the area of the lateral air guide body sections 3 and 4 can be formed by, for example, the rear fenders 11, 12 or by the trunk lid 10 of the motor vehicle. The air guide device 1 is preferably arranged on the trunk lid 10, and the air guide body sections 3, 4 extend beyond the laterally adjacent rear fenders 11, 12. Because the width of the gap 6 is minimized, a dynamic pressure can form upstream (with respect to the driving direction) of the air guide body sections 3 and 4 and/or upstream of the air guide body 2. This dynamic pressure deflects the arriving air upward, that is, over and past the air guide device 1. A dynamic pressure effect of this type can be enhanced by means of, for example, a sealing element (not shown), which is arranged in, for example, the area of the bottom surface 7 of the lateral air guide body sections 3 and 4 and which reduces or completely seals off the gap 6 remaining between the air guide body sections 3 and 4 in the external vehicle contour 5.

In addition to the improvements with respect to the aerodynamic effects which can be achieved by means of the inventive air guide device 1, the aesthetic impression can also be improved by the inventive design, i.e., by the adaptation of the bottom surface 7 of the air guide body sections 3 and 4, because overly large gaps are not usually seen as a sign of high quality.

Of course, it is also conceivable that an adjusting movement of the lateral air guide body sections 3 and 4 in the transverse direction of the vehicle could be coupled with the adjusting movement of the air guide body 2, where the latter usually executes a translational and also a rotational adjusting movement as it is being extended. In addition, it is also conceivable that the adjusting movement could take place as a function of velocity, as a result of which the aerodynamic effect which can be achieved with the air guide device 1 can be optimally adapted to the need for vehicle downforce at the specific moment in question. It would also be conceivable that, so that the air guide device 1 or parts thereof can assume the operating position GS, the device or parts thereof could be lowered in the direction of the external vehicle contour 5 or that the shape of the bottom surface 7 could be to changed to conform to the external vehicle contour, with the result that the now complementary bottom surfaces 7 of the air guide body sections 3, 4 rest closely against the external vehicle contour 5.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An air guide device for a motor vehicle that can be moved to an extended, operating position, wherein the air guide device comprises an air guide body, on which two lateral air guide body sections, which can be moved in the transverse direction of the vehicle, are arranged, wherein contours of bottom surfaces of the lateral air guide body sections facing a contour of the vehicle conform to the cooperating external vehicle contour at least when the air guide body sections are in the operating position.

2. An air guide device according to claim 1, wherein the contours of the bottom surfaces of the lateral air guide body sections facing the vehicle conform to the cooperating external vehicle contour.

3. An air guide device according to claim 2, wherein, as a result of the conformity of the contours of the bottom surfaces of the lateral air guide body sections to the cooperating external vehicle contour, a gap between a bottom surface of an air guide body section and its cooperating external vehicle contour is minimized when the air guide device is maintained in the operating position.

4. An air guide device according to claim 1, wherein the bottom surface of at least one lateral air guide body section comprises at least one recess designed to be complementary with respect to the cooperating external vehicle contour.

5. An air guide device according to claim 1, wherein an adjusting movement of the lateral air guide body sections in the transverse direction of the vehicle is coupled with an adjusting movement of the air guide body.

6. An air guide device according to claim 1, wherein the air guide body, together with the lateral air guide body sections lie on the external vehicle contour when in the operating position.

7. An air guide device according to claim 1, wherein, in an area of the bottom surfaces of the lateral air guide body sections, a sealing element is positioned, which seals off the gap remaining between the air guide body sections and the external vehicle contour.

8. A motor vehicle including an air guide device according to claim 1.

9. An air guide device according to claim 1, wherein the air guide device is a rear spoiler.

* * * * *